(12) United States Patent
Bartlow

(10) Patent No.: US 11,230,124 B2
(45) Date of Patent: Jan. 25, 2022

(54) REPRINTS OF DELAYED PAGES

(71) Applicant: Hewlett-Packard Development Company, L.P., Spring, TX (US)

(72) Inventor: Brian Todd Bartlow, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/978,588

(22) PCT Filed: Apr. 11, 2018

(86) PCT No.: PCT/US2018/027028
§ 371 (c)(1),
(2) Date: Sep. 4, 2020

(87) PCT Pub. No.: WO2019/199295
PCT Pub. Date: Oct. 17, 2019

(65) Prior Publication Data
US 2021/0031544 A1 Feb. 4, 2021

(51) Int. Cl.
*B41J 11/00* (2006.01)
*B41J 13/00* (2006.01)
*G06K 15/16* (2006.01)

(52) U.S. Cl.
CPC ......... *B41J 13/0027* (2013.01); *B41J 11/008* (2013.01); *B41J 11/0095* (2013.01); *B41J 13/0018* (2013.01); *G06K 15/16* (2013.01)

(58) Field of Classification Search
CPC .. B41J 13/0027; B41J 11/008; B41J 13/0018; B41J 11/0095; G06K 15/16
See application file for complete search history.

(56) References Cited

U.S. PATENT DOCUMENTS

| | | |
|---|---|---|
| 5,644,494 A | 7/1997 | Richardson |
| 6,010,127 A | 1/2000 | DiCesare et al. |
| 6,055,361 A | 4/2000 | Fujita |
| 6,604,017 B1 | 8/2003 | Richardson et al. |
| 8,805,256 B2 | 8/2014 | Shirai |
| 2011/0002721 A1 | 1/2011 | Yamazaki |
| 2014/0008859 A1* | 1/2014 | Gotoda .................. B65H 5/06 271/4.01 |
| 2016/0376116 A1* | 12/2016 | Suzuki .................... B65H 7/06 271/262 |
| 2019/0113878 A1* | 4/2019 | Sakaguchi ......... G03G 15/0136 |

FOREIGN PATENT DOCUMENTS

| | | |
|---|---|---|
| EP | 609747 | 2/1995 |
| JP | 3044939 B2 | 5/2000 |
| JP | 2016043993 | 4/2016 |

* cited by examiner

*Primary Examiner* — Yaovi M Ameh
(74) *Attorney, Agent, or Firm* — HP Inc. Patent Department

(57) ABSTRACT

An example device includes a page sensor to detect a page of a print medium picked from a source tray of a printer. The device further includes a processor connected to the page sensor. The processor is to determine a delay in detection by the page sensor of the page conveyed by a page feed mechanism. In response to determination of the delay, the processor is to control the page feed mechanism to continue to convey the page through the printer and the processor is further to trigger the printer to reprint data intended for the page to a subsequently picked page of print medium.

15 Claims, 5 Drawing Sheets

REPRINTS OF DELAYED PAGES

BACKGROUND

Printers are widely used to print data to various types of media. Printers range from desktop printers capable of printing documents from a personal computer to printing presses that may print large volumes of material at high speeds for subsequent distribution. User interfaces used with printers include screens, keyboards, and similar components provided to a printer or to a computer connected to a printer.

DETAILED DESCRIPTION

Normal user interactions with printers may be remote from the printer, such as through a computer that is network connected to the printer. For example, a user may print a document from their desk and then later fetch the document from the printer. When the printer operation halts unexpectedly, it may be the case that the printer issues a notification to a user or technical support person to troubleshoot the printer. A print job may be interrupted and pending print jobs may be delayed. Further, a person may have to attend to the physical location of the printer to perform a physical intervention, such as opening/closing access doors, actuating levers, removing jammed or improperly fed print media, or similar. Frequent unexpected halts may inconvenience users, reduce productivity, induce wear on components of the printer.

A page of print medium, such as paper, may not be successfully picked from a source tray in time to print. This may trigger an error that prompts for user intervention. This error may be generic or may indicate a jam. Often when the user intervenes in this kind of situation, the user finds nothing to do.

When it is determined that a page is or will be delayed arriving to a print element that is to apply the desired image to the page, a misprint may be declared. The page may continue to be conveyed through the printer, as if it were printed. The page may be noted by the printer as being a misprint page. The printer may then pick a second page and reprint the image originally destined for the misprinted page to the second page. The printer may notify the user that the output bin contains a misprint along with the properly printed page. Notification may be provided to the user passively, reducing or eliminating a need for the user to actively perform a physical intervention during the print job.

Figure 1:
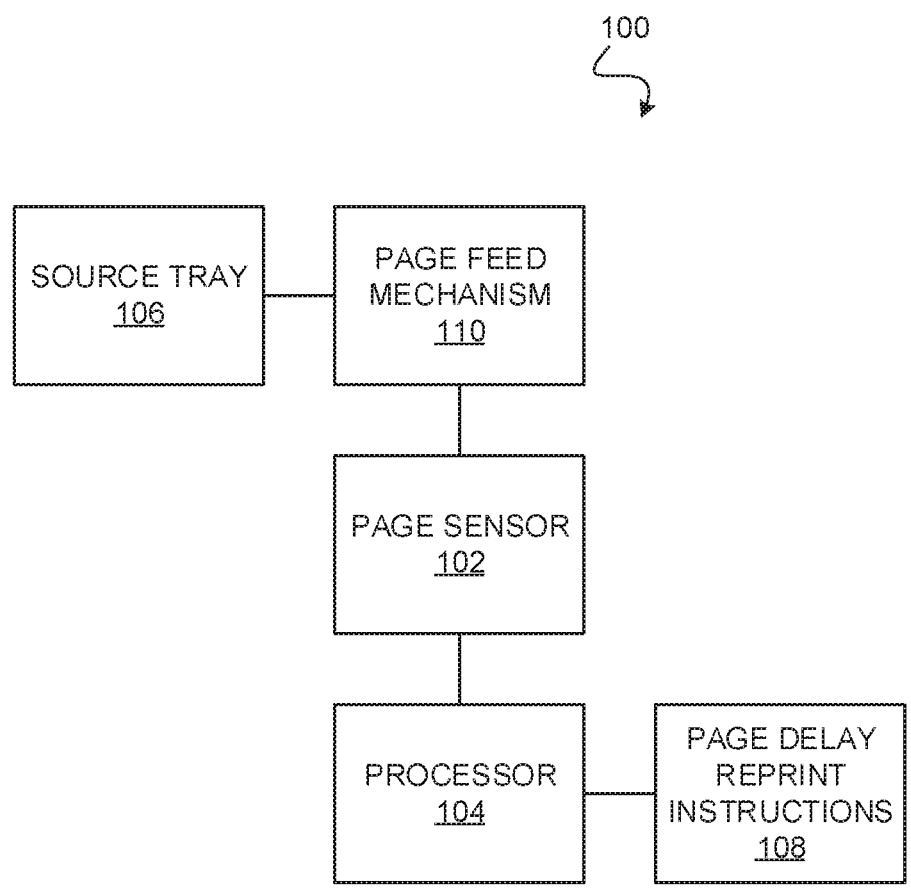
FIG. 1 is a block diagram of an example device to reprint a delayed page of a print medium.

FIG. 1 shows an example device 100 to reprint a delayed page of a print medium. The device 100 may be included in a printer, such as an inkjet printer, laser printer, an intermediate transfer belt (ITB) printer, or similar type of color or monochrome printer. The device 100 may be a subassembly of a printer.

The device 100 includes a page sensor 102 and a processor 104 connected to the page sensor 102.

The page sensor 102 is to detect a page of print medium, such as paper, cardstock, transparent film, or similar. The page may be picked from a source tray 106 of a printer to which the device 100 is provided. The page sensor 102 may be a photosensor, contact switch, or similar device able to detect the presence or absence a page.

The page sensor 102 may be positioned in a path that the page travels between the source tray 106 and a print element that applies an image to the page. The page sensor 102 may be positioned near or inside the source tray 106 and may be used to determine whether a page has been successfully picked from the source tray 106.

The processor 104 is to determine a delay in detection of a page by the page sensor 102 and trigger a reprint of the page in response to detection of the delay. To achieve this, page delay reprint instructions 108 may be provided for execution by the processor 104.

The processor 104 may include a central processing unit (CPU), a microcontroller, a microprocessor, a processing core, a field-programmable gate array (FPGA), and/or similar device capable of executing instructions. The processor 104 may cooperate with a non-transitory machine-readable medium that may be an electronic, magnetic, optical, and/or other physical storage device that encodes executable instructions. The machine-readable medium may include, for example, random access memory (RAM), read-only memory (ROM), electrically-erasable programmable read-only memory (EEPROM), flash memory, a storage drive, an optical disc, and/or similar.

A page feed mechanism 110 may be used to convey the page through a printer to which the device 100 is provided and the processor 104 detects a delay in the conveyance of the page. Delay may be due to various circumstances, such as (a) the page was not successfully picked from the source tray 106, (b) the page was successfully picked from the source tray 106 but the picking of the page was delayed, and (c) the page was successfully picked but a malfunction, such as a paper jam, occurred prior to the page reaching the page sensor 102. The page feed mechanism 110 may be started when a print job is started.

The processor 104 may reference the page sensor 102 and a timer to monitor for such a delay. In response to determination of a delay, the processor 104 may control the page feed mechanism 110 to continue to convey the page, if present in the page feed mechanism 110, through the printer. The processor 104 may further trigger the printer to reprint data intended for the page to a subsequently picked page of print medium.

The printer that contains the device 100 may have a paper path that may be able to simultaneously process a plurality of pages of a print job. Hence, in the case where the page was not successfully picked from the source tray 106, the processor 104 may control the page feed mechanism 110 to continue to operate for a time to flush any earlier page from the printer, completing printing of such page if possible. That is, in response to no detection of the present page by the page sensor 102, the processor 104 continues to convey any pages that may still be in the printer, including possibly the present page if it was actually picked but not yet sensed. The processor 104 then triggers the printer to reset. After reset, the processor 104 controls the page feed mechanism 110 to again attempt to convey the page. This process may be performed without outputting a user notification, such that the user need not be made aware of the failure to pick a page. The reset may be triggered by a lack of signal from the page sensor 102 after a predetermined time or number of pick attempts. The time waited may be longer than a page print window of the printer and, for the first page of a print job, the page print window may be very long or of indeterminate length.

In the case where the page was successfully picked from the source tray 106 but was delayed, the processor 104 may control the page feed mechanism 110 to continue to operate for a time to flush the late-picked page from the printer and, if appropriate, to flush any earlier page from the printer, completing printing of such page if possible. The late-picked page may be flushed without being printed, as the print element may operate in a page print window, outside of which printing to a page is not possible or detrimental to operation of the printer. For example, it may be important to maintain timing between the page feed mechanism 110 and the toner application belt of an ITB printer, particularly if the printer simultaneously processes a plurality of pages.

In the case where the page was successfully picked but a malfunction, such as a paper jam, occurred, the processor 104 controlling the page feed mechanism 110 to continue to operate for a time before detection of such malfunction may or may not worsen the malfunction. However, making a jam worse by continuing to feed the page for a short time may be considered a rare side effect.

Continuing to operate the page feed mechanism 110 in response to a delay measured by the page sensor 102 may reduce the need for user intervention during a print job, as a late-picked page may be flushed and reprinted instead of assuming a jam or other malfunction has occurred. Wear on printer components may be reduced. For example, requesting user intervention may result in a user opening and closing an access door or moving other components of the printer, inducing wear. Starting and stopping a page feed mechanism may induce wear and reduce its service life.

The instructions 108 may cause the processor 104 to generate a message indicative of the determination of the delay in detection of the page. The message may include an error code, a user notification, a descriptor, or similar. The message may be applied depending on the structure of the printer to which the device 100 is provided. If the processor 104 also provides user or communications interface functions to the printer, then a representation of the message may be displayed at the user interface or transmitted to a computer or other device for display to a user. The message may be displayed to the user as a notification that a misprinted page was flushed to an output bin. The user may then inspect the completed print job to remove any misprinted pages.

If the processor 104 is subordinate to a central processor of the printer to which the device 100 is provided, then the processor 104 may transmit the message to the central processor and the central processor may cause a representation of the message may be displayed at the user interface or transmitted to a computer or other device for display to a user. A subordinate processor may control mechanical operations of the printer, while a central processor may control the overall function of the printer and its interface to sources of data to be printed and user devices. A subordinate processor may be termed a formatter processor.

Figure 2:
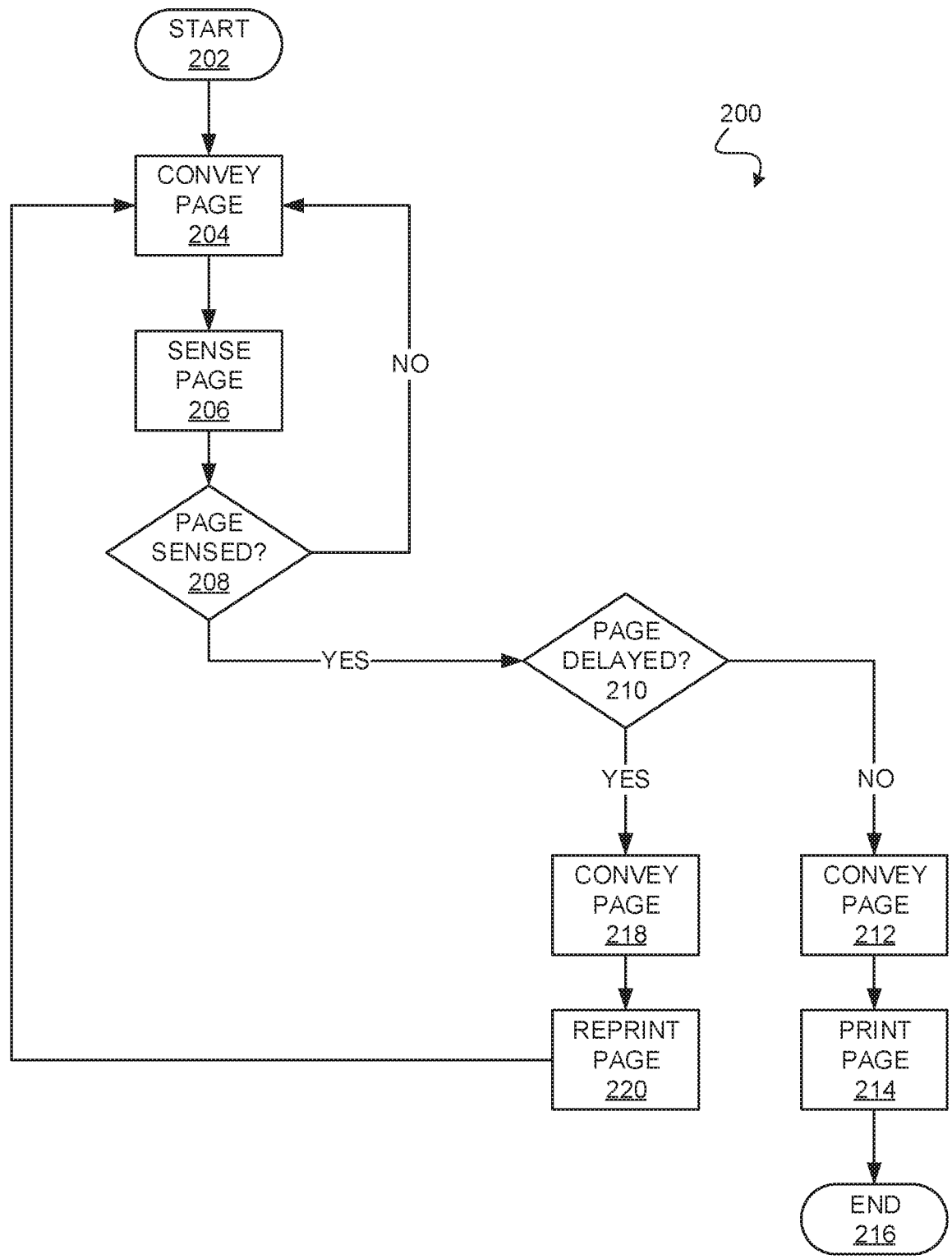
FIG. 2 is a flowchart of an example method to reprint a delayed page of a print medium.

FIG. 2 shows an example method 200 to reprint a delayed page. The method 200 may be performed by any of the devices and systems described herein. The method 200 begins at block 202.

At block 204, a page of a print job is picked from a source tray and conveyed by a page feed mechanism towards a print element that is to apply an image to the page. The image may be based on data, such as text, graphics, and the like contained in a document.

At block 206, the page is sensed, if possible. This may include using a page sensor to detect whether or not the page is conveyed in a path past a particular location. Successfully sensing of the page may indicate that the page was successfully picked from the source tray. The page is attempted to be picked and conveyed, via block 208, until sensed or until failure condition is triggered, such as timeout or number of pick attempts.

At block 210, it is determined whether the page is delayed. A timer may be used and an elapsed time may be compared to a page print window, such as a timeslot within which the page may be printed successfully. If the page is not delayed, the page continues to be conveyed by the page feed mechanism, at block 212, and is printed normally at block 214. The method 200 then ends at block 216, and the method 200 may be repeated for a subsequent page of the print job until the print job is completed.

If the page is delayed, the page continues to be conveyed by the page feed mechanism, at block 218, and a reprint of the page is triggered at block 220. The page may be considered a misprint that is flushed through the printer. The method 200 is then repeated for the same data that was intended for the misprint page and, if successful on the subsequent attempt, the data is printed at block 214.

Flushing the misprint page, at block 218, may include controlling the page feed mechanism to simultaneously convey a plurality of pages of the print job through the printer. That is, the printer may be of a type that processes several pages at the same time, and conveying the misprint page through the printer may include conveying earlier pages through the printer. An earlier page may be a successfully printed page.

Block 220 may include generating a message indicative of the determination of the delay in detection of the page. A representation of the message may be outputted at a user interface to inform the user that an output bin of the printer contains a misprint.

Figure 3:
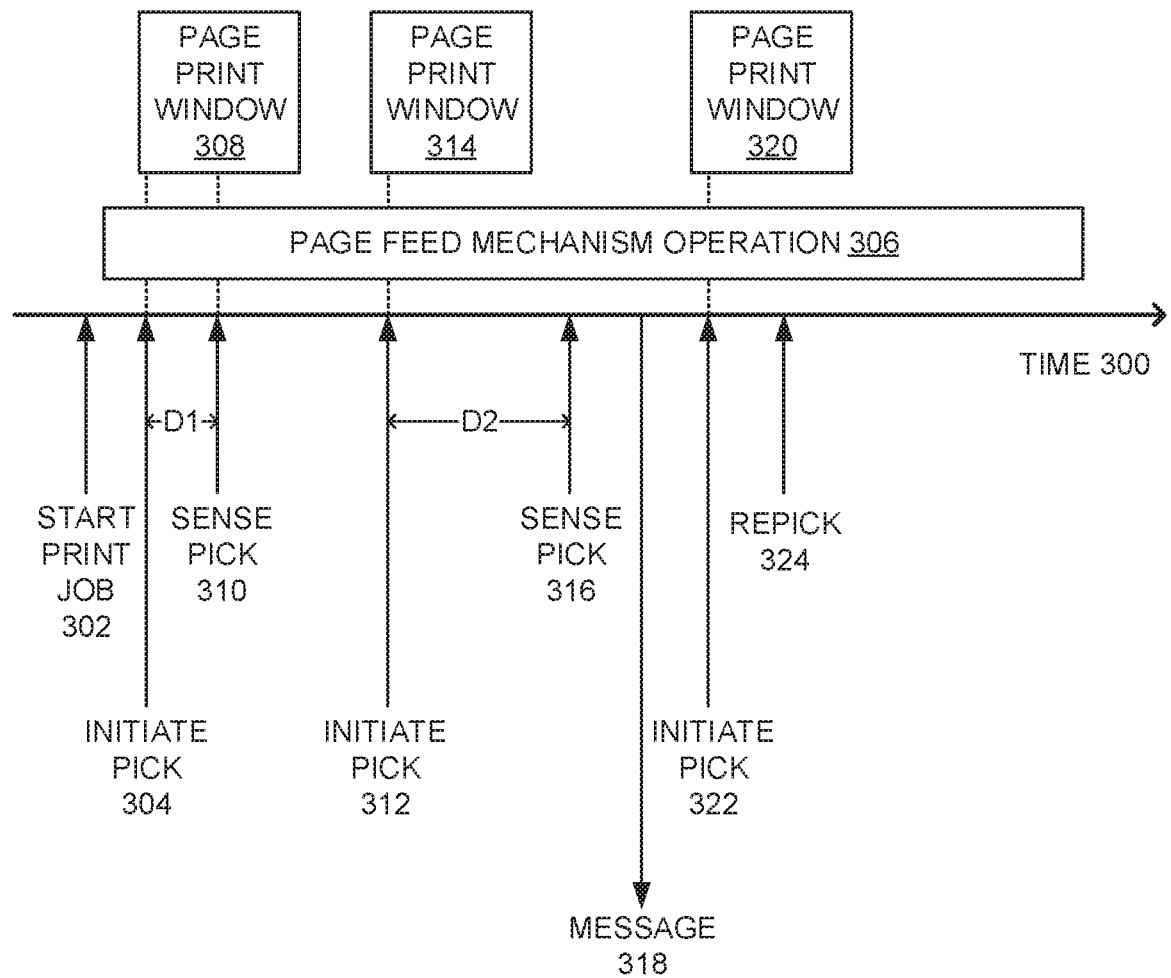
FIG. 3 is a timing diagram of an example delayed pick of a page of print medium.

FIG. 3 shows a timing diagram of pages of a print medium being picked from a source tray, as measured in time 300. The pages may belong to a print job.

At time 302, a print job is started and subsequently at time 304 the picking of a page from a source tray is initiated and operation 306 of the page feed mechanism is started. A successful pick is monitored for during a page print window 308, which may be defined as an acceptable duration of time during which a picked page may be successfully printed. In the example shown, a successful pick is sensed after an elapsed time 310 representative of a delay D1. The delay D1 falls within the page print window 308 and the page is printed normally. Picking of next page in the print job is initiated at time 312. A successful pick is monitored for during a page print window 314. In the example shown, a successful pick is sensed at an elapsed time 316 representative of a delay D2. The delay D2 falls outside the page print window 314 and the page is determined to be a misprint and is fed through the page feed mechanism, which continues in its operation 306 and is not halted. A message may then be generated at time 318 to indicate to the user or to a central processor that a misprint has occurred. The misprint page is set to be reprinted during a subsequent page print window 320 and picking of a subsequent page of print medium is attempted at time 322.

During a page print window 320, if an attempt to pick a page is unsuccessful, as may be determined by failure of a sensor to register pick by within an expected time, then a repick may be attempted at a later time 324. Any number of repicks may be attempted, as may be limited by the length of the page print window 320.

As shown in FIG. 3, operation 306 of the page feed mechanism continues during a delayed pick that triggers a reprint.

Figure 4:
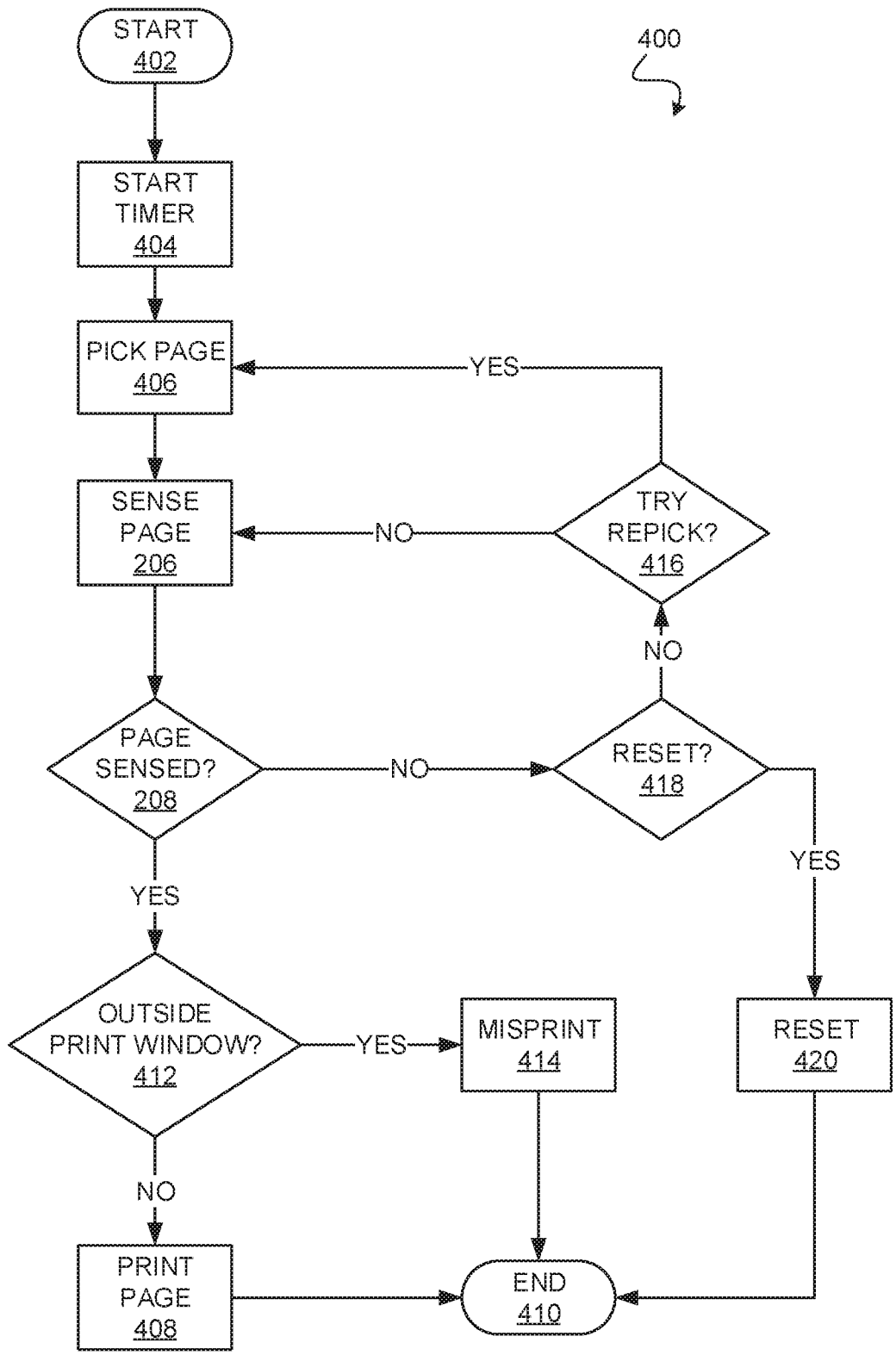
FIG. 4 is a flowchart of an example method to time a delayed page of a print medium.

FIG. 4 shows an example method 400 to time a delayed page of a print medium. The method 400 may be performed by any of the devices and systems described herein. The method 400 begins at block 402.

At block 404, a timer may be started.

At block 406, a page of a print medium is attempted to be picked from a source tray. A page feed mechanism may be used to pick and convey the page.

At block 206, a sensor may be used to determine whether the page was successfully picked. If the pick was successful, via block 208, then it is determined whether a page print window has elapsed, at block 412. An elapsed time from the timer may be compared to a page print window. An unacceptable delay is determined when the elapsed time exceeds or falls outside the page print window. In such case, a misprint may be determined, at block 414, and the misprint page, as well as any other pages in the printer that may or may not have been printed correctly, is flushed from the printer by continuing to operate the page feed mechanism. A notification to the user may be generated, such that the user may be informed to check for a misprint page. If the page print window has not elapsed, then the page is printed normally, at block 408. The method 400 then ends at block 410 and the method 400 may be repeated for subsequent pages of the print job.

If the page is not sensed, via block 208, then it is determined, at block 418, whether a reset of the printer is to be performed. A reset may be performed according to a suitable criterion, such as at a time that exceeds a reset threshold time or after a number of repick attempts have failed. A reset may be performed, at block 420, after the page print window has elapsed and the page is still not sensed. The reset criterion may be selected to provide time for any earlier pages still being processed to be completed. The page feed mechanism may continue to be operated to flush any earlier pages or flush the current page, in case the current page is picked but not yet sensed.

Block 420 represents a failure to pick the page from the source tray and, as such, there is likely no misprint page to be flushed. Reset may include reapplying imaging material, such as toner, to a print element. No user notification of the reset need be made. After reset, the method 400 ends at block 410, and the method 400 may be started again to attempt to print the present page.

If the reset is not to be performed, then a repick of the page may be attempted according to a repick methodology, via block 416. A repick methodology may limit a number of repick attempts to a predetermined number, such as two, and may specify a time that is to elapse between repick attempts. If a repick is attempted, then the method returns to block 406. Otherwise the method may return to block 206 to continue to monitor for the page.

The cycle of blocks 406, 206, 208, 418, 416 represents the printer attempting to pick a page from a source tray and sensing whether the pick was successful. If the page is not picked and a reset criterion is met, the printer may reset and may reapply imaging material to a print element. A subsequent execution of the cycle of blocks 406, 206, 208, 418, 416 may then result in a successful pick. If the page is sensed as successfully picked, then the elapsed time is compared to the page print window and the page is either printed normally or determined to be a misprint that is flushed from the printer. A user notification of the misprint may be outputted and an attempt to reprint data intended for the page may be made with a subsequently fed page.

Figure 5:
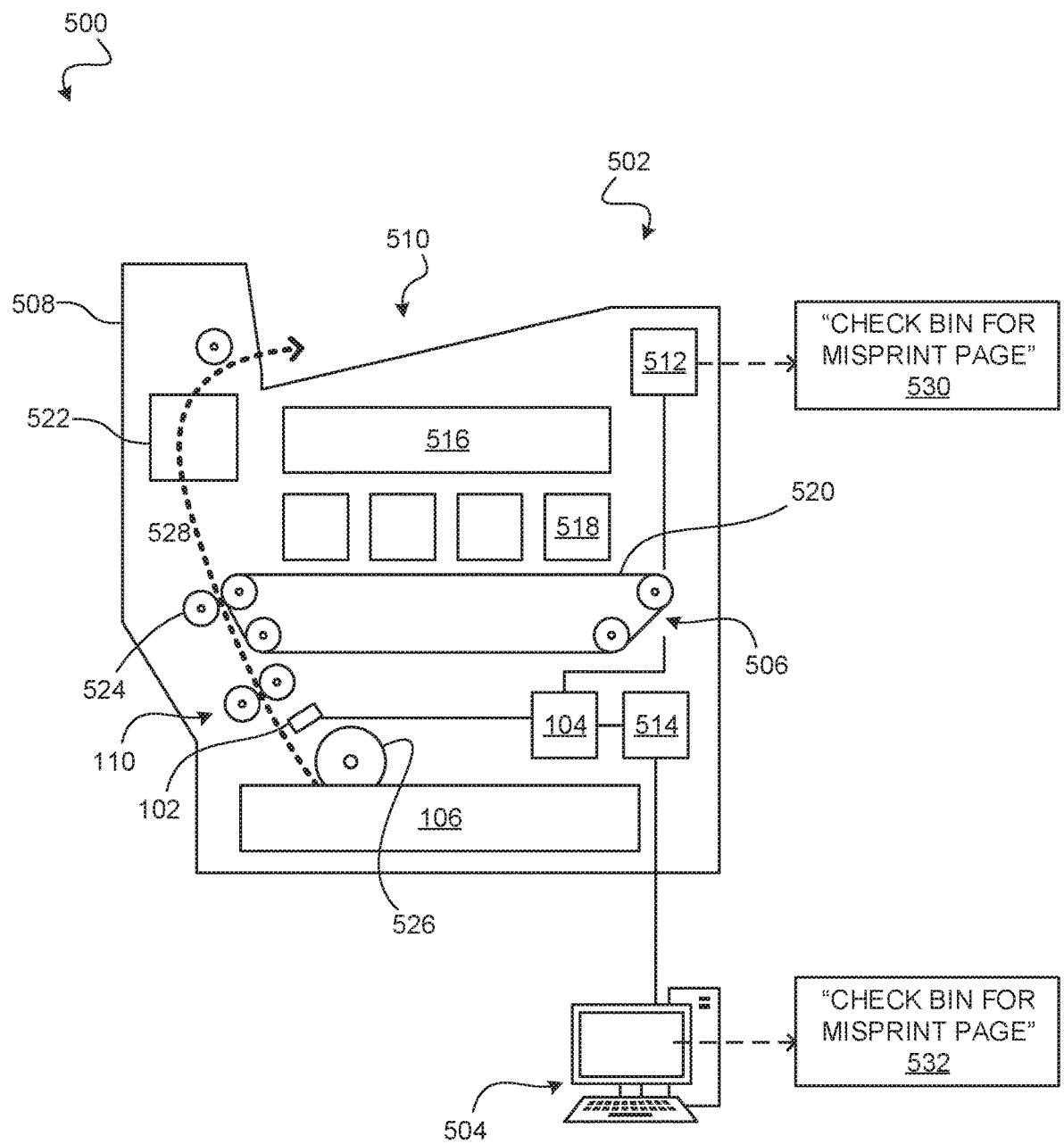
FIG. 5 is a block diagram of an example system including an example printer to reprint a delayed page of a print medium.

FIG. 5 shows an example system 500 that may include an example printer 502 and an example computer 504. The printer and computer may be connected directly or through a computer network. Any of the devices and methods discussed herein may be used with the system 500. Description of components of the system 500 already provided herein will not be repeated here. Like reference numerals denote like components and the description elsewhere herein may be referenced.

The printer 502 includes a source tray 106 to store pages of a print medium, a print element 506 to apply images to pages, a page feed mechanism 110 to pick pages from the source tray 106 and convey pages to and from the print element 506, a page sensor 102 to detect the page in the page feed mechanism, a processor 104.

The printer 502 may further include a housing 508 to contain the components of the printer 502, an output bin 510 to receive printed and misprint pages, a user interface 512 connected to the processor 104 to allow user input/output, and a communications interface 514 connected to the processor 104 to connect the printer 502 to a computer 504 or computer network.

The type of print element 506 depends on the type of printer. In this example, the printer 502 is an ITB printer and the print element 506 may include a laser subassembly 516, a toner cartridge 518 (or several for color printing), an intermediate transfer belt or ITB 520, and a fuser 522. The laser subassembly 516 and toner cartridge 518 deposit toner onto the belt 520. The belt 520 may be driven to move with respect to pages fed by the page feed mechanism 110 and to transfer toner to the pages. After transfer of toner to a page, the may fuser 522 the toner to the page. Toner for a plurality of pages may be present on the belt 520 at the same time. A number of pages that may need to be flushed in response to detection of a misprint due to delay may depend on a specific implementation of the belt 520 and the page feed mechanism 110 as well as the type of print job.

The page feed mechanism 110 may include a plurality of rollers 524, which may include a pickup roller 526 to pick pages from the source tray 106.

The printer 502 may further include a mechanism for duplex printing, an external paper feed door and feed mechanism, an additional source tray, and similar components that are omitted from view for clarity.

A path followed by pages of print medium is shown at 528.

The processor 104 is connected to the page sensor 102 and the page feed mechanism 110 to control the page feed mechanism 110 based on sensing or not sensing a page of print medium with the page sensor 102. The processor determines a delay in detection of a page by the page sensor 102. When the delay is detected, the processor 104 controls the page feed mechanism 110 to flush the delayed page and trigger the print element 506 to reprint data originally intended for the flushed page to a subsequent page picked from the source tray 106. Reprinting data may include reapplying imaging material with the print element 506, such as by reapplying toner to the belt 520.

When the printer 502 operates on a plurality of pages of a print job at the same time, the processor 104 may control the page feed mechanism 110 to continue to convey the plurality of pages, so as to continue printing earlier pages, if possible, and flush any misprinted pages.

The processor 104 may control the page feed mechanism 110 to continue to convey a misprinted page or earlier page in the same job by maintaining or increasing a rotational speed of a roller 524. Maintaining roller speed may reduce or eliminate wear or inconvenience in stopping the print job, even temporarily. Increasing roller speed may reduce the delay in flushing a misprinted page.

The processor 104 may generate a message indicative of the delayed page. A representation 530 of the message may be outputted at the user interface 512 of the printer 502. For example, the user may be notified to check the output bin for a misprinted page via a textual, image, audible, or similar representation. A representation 532 of the message may be outputted at the computer 504.

It should apparent from the above, that a misprinted page may be flushed through a page feed mechanism and into an output bin, so that user intervention due to a delayed page pick may be reduced or avoided. This may increase user convenience and reduce wear on printer components. Further, flushing misprinted pages through the page feed mechanism may mean that a diverting mechanism upstream of the print element may not be needed and that little specialized programming may be needed beyond instructions to reprint a page and notify a user to check an output bin for misprints.

It should be recognized that features and aspects of the various examples provided above may be combined into further examples that also fall within the scope of the present disclosure.

The invention claimed is:

1. A device comprising:
a page sensor to detect a page of a print medium picked from a source tray of a printer; and
a processor connected to the page sensor, the processor to determine a delay in detection by the page sensor of the page conveyed by a page feed mechanism;
in response to determination of the delay, the processor to control the page feed mechanism to continue to convey the page through the printer and the processor further to trigger the printer to reprint data intended for the page to a subsequently picked page of print medium.

2. The device of claim 1, wherein the processor, in response to the determination of the delay, is to control the page feed mechanism to simultaneously convey a plurality of pages of a print job through the printer.

3. The device of claim 1, wherein the processor is to determine the delay in detection of the page by comparing an elapsed time to pick the page to a page print window, wherein the delay is determined when the elapsed time is outside the page print window.

4. The device of claim 3, wherein the processor is to initiate a repick of the page from the source tray when the page sensor does not detect the page and the elapsed time is inside the page print window.

5. The device of claim 1, wherein, in response to no detection of the page by the page sensor, the processor is to trigger the printer to reset.

6. The device of claim 1, wherein the processor is a subordinate processor and is further to generate a message indicative of the determination of the delay in detection of the page and transmit the message to a central processor of the printer.

7. A device comprising:
a source tray to store a page of a print medium;
a print element to apply an image to the page;
a page feed mechanism to pick the page from the source tray and convey the page to and from the print element;
a page sensor to detect the page in the page feed mechanism; and
a processor connected to the page sensor and the page feed mechanism, the processor to determine a delay in detection of the page by the page sensor and, in response to determination of the delay, control the page feed mechanism to flush the page and trigger the print element to reprint data intended for the page to a subsequent page of print medium.

8. The device of claim 7, wherein the processor is further to generate a message indicative of the determination of the delay in detection of the page, a representation of the message to be outputted at a user interface to indicate a presence of the page as a misprinted page in an output bin of the device.

9. The device of claim 7, wherein the processor, in response to the determination of the delay, is to control the page feed mechanism to continue to convey a plurality of pages of a print job to which the page belongs.

10. The device of claim 7, wherein the processor is to determine the delay in detection of the page by comparing an elapsed time to pick the page to a page print window, wherein the delay is determined when the elapsed time is outside the page print window.

11. The device of claim 10, wherein the processor is to trigger the page feed mechanism to repick the page from the source tray when the page sensor does not detect the page and the elapsed time is inside the page print window.

12. The device of claim 7, wherein the print element is to reprint the data intended for the page by reapplying imaging material to the print element.

13. The device of claim 7, wherein the page feed mechanism comprises a roller, and wherein the processor is to control the page feed mechanism to continue to convey the page by maintaining or increasing a rotational speed of the roller.

14. A non-transitory machine-readable medium comprising processor-executable instructions that when executed by a processor cause the processor to determine a delay in detection of a page by a page sensor of a printer and, in response to determination of the delay, control a page feed mechanism of the printer to continue to convey the page and trigger the printer to reprint data intended for the page to a subsequently picked page of print medium.

15. The non-transitory machine-readable medium of claim 14, wherein the instructions are to cause the processor to trigger the printer to reset in response to no detection of the page by the page sensor.

\* \* \* \* \*